United States Patent
Im et al.

(10) Patent No.: US 8,501,848 B2
(45) Date of Patent: Aug. 6, 2013

(54) POLYCARBONATE RESIN COMPOSITION FOR FLAME RETARDANT FILM, FLAME RETARDANT FILM INCLUDING THE RESIN COMPOSITION AND METHOD FOR PRODUCING THE FLAME RETARDANT FILM

(75) Inventors: Chang Gyu Im, Uiwang-si (KR); Sung Kook Kim, Uiwang-si (KR); Jin Woo Lee, Uiwang-si (KR); Cheol Ho Kim, Uiwang-si (KR); Gyu Chan Cho, Uiwang-si (KR); Sun Hong Park, Uiwang-si (KR)

(73) Assignee: Cheil Industries, Inc., Gumi-si, Kyeongsangbuk-do (KR)

( * ) Notice: Subject to any disclaimer, the term of this patent is extended or adjusted under 35 U.S.C. 154(b) by 0 days.

(21) Appl. No.: 13/525,475

(22) Filed: Jun. 18, 2012

(65) Prior Publication Data

US 2012/0252947 A1    Oct. 4, 2012

Related U.S. Application Data

(63) Continuation of application No. PCT/KR2010/009079, filed on Dec. 17, 2010.

(30) Foreign Application Priority Data

Dec. 17, 2009  (KR) .................... 10-2009-0126388

(51) Int. Cl.
*C08L 69/00* (2006.01)
*B29C 47/88* (2006.01)
*B29C 47/00* (2006.01)

(52) U.S. Cl.
USPC ...................... 524/165; 264/177.19

(58) Field of Classification Search
USPC ...................... 524/165; 264/177.19
See application file for complete search history.

(56) References Cited

U.S. PATENT DOCUMENTS

| 4,110,299 A * | 8/1978 | Mark ............................... 524/84 |
| 2005/0245670 A1 | 11/2005 | Sato |
| 2009/0239975 A1 | 9/2009 | Jung et al. |

FOREIGN PATENT DOCUMENTS

| EP | 1 548 065 A1 | 6/2005 |
| EP | 1 548 065 B1 | 7/2011 |
| JP | 06-136247 | * 5/1994 |
| KR | 10-2005-0120238 A | 12/2005 |
| KR | 10-2008-0062503 A | 7/2008 |
| WO | WO 2008/082202 A1 | 7/2008 |

OTHER PUBLICATIONS

Machine translation of JP 06-136247. May 1994.*
International Search Report issued in PCT/KR2010/009079 dated Sep. 29, 2011.

* cited by examiner

*Primary Examiner* — John Uselding
(74) *Attorney, Agent, or Firm* — Lee & Morse, P.C.

(57) ABSTRACT

A polycarbonate resin composition for a flame retardant film includes 100 parts by weight of a polycarbonate resin, about 0.01 to about 10 parts by weight of a silicon compound, about 0.01 to about 1.5 parts by weight of an organic sulfonic acid metal salt having an average particle diameter of about 100 to about 400 μm, and about 0.01 to about 1 part by weight of a polyfluoroethylene resin.

20 Claims, 4 Drawing Sheets

TABLE 1

| Composition | | 1 | 2 | 3 | 4 | 5 | 6 |
|---|---|---|---|---|---|---|---|
| | | | | Examples | | | |
| Polycarbonate resin | | 100 | 100 | 100 | 100 | 100 | 100 |
| Silicon compound | | 5 | 5 | 10 | 1 | 5 | 1 |
| Organic sulfonic acid metal salt (Average particle diameter, μm) | | 0.3 (100) | 0.3 (400) | 0.1 (400) | 0.5 (100) | 1 (400) | 0.3 (100) |
| Polyfluoroethylene | | 0.5 | 0.5 | 0.3 | 0.2 | 0.5 | 0.8 |
| Glass transition temp. (°C) | | 148.7 | 149.2 | 150.5 | 149.8 | 151.2 | 149.3 |
| Flame retardancy | Total combustion time (sec) | 23 | 28 | 23 | 35 | 30 | 35 |
| | Number of drips (whether or not cotton caught fire) | 0 | 0 | 0 | 0 | 0 | 0 |
| | Rating | VTM-0 | VTM-0 | VTM-0 | VTM-0 | VTM-0 | VTM-0 |

FIG. 3

TABLE 2

| Composition | | Comparative Examples | | | | | |
|---|---|---|---|---|---|---|---|
| | | 1 | 2 | 3 | 4 | 5 | 6 |
| Polycarbonate resin | | 100 | 100 | 100 | 100 | 100 | 100 |
| Silicon compound | | 0 | 5 | 5 | 5 | 15 | 5 |
| Organic sulfonic acid metal salt (Average particle diameter, μm) | | 1 (100) | 0 | 1 (400) | 1.7 (400) | 0 | 0.5 (100) |
| Polyfluoroethylene | | 0 | 0 | 0 | 0.5 | 0.5 | 0 |
| Glass transition temp. (°C) | | 147.6 | 149.6 | 148.9 | Resin decomposed | 149.9 | 149.7 |
| Flame retardancy | Total combustion time (sec) | 89 | 73 | 28 | - | 64 | 32 |
| | Number of drips (whether or not cotton caught fire) | 0 (Completely burned) | 4 (○) | 2 (○) | - | 0 | 3 (○) |
| | Rating | Fail | VTM-2 | VTM-2 | - | VTM-1 | VTM-2 |

FIG. 4

TABLE 3

|  |  | Examples | | | | | | | Comparative Examples | | | |
|---|---|---|---|---|---|---|---|---|---|---|---|---|
|  |  | 7 | 8 | 9 | 10 | 11 | 12 | 13 | 7 | 8 | 9 | 10 |
| Average particle diameter (μm) of organic sulfonic acid metal salt | | 100 | 150 | 200 | 250 | 300 | 350 | 400 | 80 | 90 | 450 | 500 |
| Physical properties | Glass transition temp. (°C) | 148.7 | 150.1 | 149.2 | 148.9 | 150.3 | 148.1 | 149.2 | 151.2 | 150.1 | 149.3 | 148.7 |
| | Flame retardancy | Total combustion time (sec) | 23 | 27 | 30 | 32 | 27 | 21 | 28 | 39 | 52 | 57 | 55 |
| | | Number of drips (whether or not cotton caught fire) | 0 | 0 | 0 | 0 | 0 | 0 | 0 | 1 (1) | 0 | 0 | 1 (1) |
| | | Rating (VTM) | 0 | 0 | 0 | 0 | 0 | 0 | 0 | 2 | 1 | 1 | 2 |

POLYCARBONATE RESIN COMPOSITION FOR FLAME RETARDANT FILM, FLAME RETARDANT FILM INCLUDING THE RESIN COMPOSITION AND METHOD FOR PRODUCING THE FLAME RETARDANT FILM

CROSS-REFERENCE TO RELATED APPLICATION

This application is a continuation of pending International Application No. PCT/KR2010/009079, entitled "Polycarbonate Resin Composition for Flame Retardant Film, Flame Retardant Film Including the Resin Composition and Method for Producing the Flame Retardant Film," which was filed on Dec. 17, 2010, the entire contents of which are hereby incorporated by reference.

BACKGROUND

1. Field

Embodiments relate to a polycarbonate resin composition for a flame retardant film, a flame retardant film including the resin composition, and a method for producing the flame retardant film.

2. Description of the Related Art

Polycarbonate resins are thermoplastic resins that possess higher transparency and better characteristics in terms of mechanical properties and heat resistance than other polymeric resins. Films based on polycarbonate resins are easy to produce and mold. Due to these advantages, polycarbonate resin films are widely used at present in various industrial fields.

SUMMARY

Embodiments are directed to a polycarbonate resin composition for a flame retardant film, the composition including: 100 parts by weight of a polycarbonate resin, about 0.01 to about 10 parts by weight of a silicon compound, about 0.01 to about 1.5 parts by weight of an organic sulfonic acid metal salt having an average particle diameter of about 100 to about 400 μm, and about 0.01 to about 1 part by weight of a polyfluoroethylene resin.

The polycarbonate resin may be selected from the group of a homopolycarbonate resin, a non-halogenated copolycarbonate resin, a fluorine-containing copolycarbonate resin, and a blend thereof.

The polycarbonate resin may have a weight average molecular weight of about 15,000 to about 50,000 g/mol.

The silicon compound may be represented by Formula 1:

(1)

In Formula 1, $R_2$, $R_3$, and $R_4$ may each be independently selected from the group of a substituted or unsubstituted $C_1$-$C_{15}$ alkyl group, a substituted or unsubstituted $C_2$-$C_{10}$ alkenyl group, a substituted or unsubstituted $C_5$-$C_{12}$ cycloalkyl group, and a substituted or unsubstituted $C_6$-$C_{12}$ aryl group, each Z may be independently selected from the group of a substituted or unsubstituted $C_1$-$C_{15}$ alkyl group, a substituted or unsubstituted $C_2$-$C_{10}$ alkenyl group, a substituted or unsubstituted $C_5$-$C_{12}$ cycloalkyl group, a substituted or unsubstituted $C_6$-$C_{12}$ aryl group, and —OH, n may be an integer from about 2 to about 2,000, and m may be an integer from about 2 to about 2,000.

Each of $R_2$, $R_3$, and $R_4$ may include at least one selected from the group of a fluorinated $C_1$-$C_{15}$ alkyl group, a fluorinated $C_2$-$C_{10}$ alkenyl group, a fluorinated $C_5$-$C_{12}$ cycloalkyl group, and a fluorinated $C_6$-$C_{12}$ aryl group.

The silicon compound may have a weight average molecular weight of about 5,000 to about 500,000 g/mol.

The organic sulfonic acid metal salt may include an aliphatic or aromatic sulfonic acid metal salt.

The organic sulfonic acid metal salt may include the aliphatic sulfonic acid metal salt, and the aliphatic sulfonic acid metal salt may be selected from the group of a $C_1$-$C_{10}$ alkane sulfonic acid metal salt, a fluorinated $C_1$-$C_{10}$ alkane sulfonic acid metal salt, and a combination thereof.

The organic sulfonic acid metal salt may include the aromatic sulfonic acid metal salt, and the aromatic sulfonic acid metal salt may be a diphenyl sulfone sulfonate metal salt.

The composition may further include at least one additive, the additive being selected from the group of a UV absorber, a heat stabilizer, a release agent, an antistatic agent, a dispersant, an antioxidant, a lubricant, a dye, a pigment, and an inorganic filler.

Embodiments are also directed to a method for producing a flame retardant polycarbonate film, the method including (a) blending the composition as claimed in claim 1, (b) melt-extruding the blended composition into a sheet, and (c) cooling the extruded sheet.

The composition may be blended using a twin-screw extruder.

The twin-screw extruder may have an L/D ratio (where L and D are screw length and diameter, respectively) of about 20 to about 50.

Operation (b) may be carried out using a single-screw extruder.

In operation (b), the sheet may be discharged, pressed, and cooled between two cooling rolls.

At least one of the two cooling rolls may have an embossed pattern on a sheet-contacting surface thereof.

Embodiments are also directed to a flame retardant polycarbonate film produced by the method according to an embodiment.

The film may have a glass transition temperature of at least 140° C. and a UL-94 flame retardancy of VTM-0 or better.

Embodiments are also directed to a flame retardant polycarbonate film including the composition according to an embodiment.

The film may have a glass transition temperature of at least 140° C. and a UL-94 flame retardancy of VTM-0 or better.

BRIEF DESCRIPTION OF THE DRAWINGS

Features will become apparent to those of skill in the art by describing in detail example embodiments with reference to the attached drawings in which.

DETAILED DESCRIPTION

Korean Patent Application No. 10-2009-0126388, filed on Dec. 17, 2009, in the Korean Intellectual Property Office, and entitled: "Polycarbonate Resin Composition for Flame Retardant Film, Flame Retardant Film Including the Resin Composition and Method for Producing the Flame Retardant Film," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

Polycarbonate Resin Composition

An embodiment is directed to a polycarbonate resin composition for a flame retardant film. In an example embodiment, the composition includes 100 parts by weight of (A) a polycarbonate resin, about 0.01 to about 10 parts by weight of (B) a silicon compound, about 0.01 to about 1.5 parts by weight of (C) an organic sulfonic acid metal salt having an average particle diameter of about 100 to about 400 μm, and about 0.01 to 1 about part by weight of (D) a polyfluoroethylene resin.

Polycarbonate Resin (A)

The polycarbonate resin may be a polymer produced by reacting various dihydroxydiaryl compounds with phosgene ("phosgene process"). In another implementation, the polycarbonate resin may be produced by reacting a dihydroxydiaryl compound with a carboxylic acid ester such as diphenyl carbonate ("transesterification process"). The production processes of the polycarbonate resin and methods of using the polycarbonate resin in the resin composition may be selected from generally known processes.

The polycarbonate resin may be, e.g., a homopolycarbonate or copolycarbonate resin. Further, a blend of homopolycarbonate and copolycarbonate resins may be used. In an implementation, the copolycarbonate resin is largely free of, or completely free of, any element substituted with a halogen element other than fluorine in the molecule. For example, the polycarbonate resin usable in the resin composition may be selected from homopolycarbonate resins, non-halogenated copolycarbonate resins, fluorinated copolycarbonate resins, and blends thereof.

The weight average molecular weight of the polycarbonate resin is preferably in the range of about 15,000 to about 50,000 g/mol. Within this range, a film may be easy to produce, and additives may be easy to mix and knead. More preferably, the polycarbonate resin has a weight average molecular weight of about 20,000 to about 45,000 g/mol.

In an example embodiment, the polycarbonate resin has a melt index of about 1 to 10 g/10 min, preferably about 1.5 to 8 g/10 min. Within this range, the resin composition may be highly moldable.

Silicon Compound (B)

The silicon compound is preferably a polydiorganosiloxane represented by Formula 1:

(1)

In Formula 1, $R_2$, $R_3$, and $R_4$ may each be independently selected from a substituted or unsubstituted $C_1$-$C_{15}$ alkyl group, a substituted or unsubstituted $C_2$-$C_{10}$ alkenyl group, a substituted or unsubstituted $C_5$-$C_{12}$ cycloalkyl group, and a substituted or unsubstituted $C_6$-$C_{12}$ aryl group.

In Formula 1, each Z may be the same as $R_2$, $R_3$, and $R_4$, or may be —OH,

In Formula 1, n may be an integer from about 2 to about 2,000.

In Formula 1, m may be an integer from about 2 to about 2,000.

Preferably, $R_2$, $R_3$, and $R_4$ are each independently a substituted or unsubstituted $C_1$-$C_{15}$ alkyl or $C_6$-$C_{12}$ aryl group.

Preferably, n and m are each independently an integer from about 5 to about 1,000.

The ratio of n to m may be in the range of 1:9 to 9:1. Within this range, the resin composition may be highly flame retardant and moldable.

In an embodiment, some of the constituent elements of $R_2$, $R_3$, and $R_4$ may be fluorinated. For example, each of $R_2$, $R_3$, and $R_4$ may include at least one group selected from a fluorinated $C_1$-$C_{15}$ alkyl group, a fluorinated $C_2$-$C_{10}$ alkenyl group, a fluorinated $C_5$-$C_{12}$ cycloalkyl group, and a fluorinated $C_6$-$C_{12}$ aryl group.

Preferably, the silicon compound may include at least one aryl group in the molecular structure.

The weight average molecular weight of the silicon compound is preferably in the range of about 5,000 to about 500,000 g/mol. Within this range, it may be easy to uniformly disperse the silicon compound in the polycarbonate resin, excellent heat resistance and flame retardancy may be achieved, and good moldability may be attained. The silicon compound may be present in an amount of about 0.01 to about 10 parts by weight, based on 100 parts by weight of the polycarbonate resin. The presence of the silicon compound within the range defined above may help ensure sufficient flame retardancy, and may facilitate feeding of the resin into an extruder without deterioration in the frictional force of the resin. The silicon compound is preferably present in an amount of about 0.1 to about 10 parts by weight, more preferably about 1 to about 10 parts by weight, and most preferably about 1 to about 5 parts by weight, based on 100 parts by weight of the polycarbonate resin.

Organic Sulfonic Acid Metal Salt (C)

The organic sulfonic acid metal salt may be a non-halogenated flame retardant, for example, an aliphatic or aromatic sulfonic acid metal salt.

The aliphatic sulfonic acid metal salt may be, e.g., a $C_1$-$C_{10}$ alkane sulfonic acid metal salt, or a $C_1$-$C_{10}$ alkane sulfonic acid metal salt in which the hydrogen atoms of the alkyl group(s) are replaced by fluorine atoms. As the aliphatic sulfonic acid metal salt, a perfluoroalkanesulfonic acid metal salt is preferable.

The perfluoroalkanesulfonic acid metal salt may have a structure of Formula 2:

(2)

In Formula 2, M may be a metal cation and/may be an integer from 1 to 8.

Examples of preferred perfluoroalkanesulfonic acid metal salts may include metal salts of perfluoromethanesulfonic acid, metal salts of perfluoroethanesulfonic acid, metal salts of perfluoropropanesulfonic acid, metal salts of perfluorobutanesulfonic acid, metal salts of perfluoropentanesulfonic acid, metal salts of perfluorohexanesulfonic acid, metal salts of perfluoroheptanesulfonic acid, and metal salts of perfluorooctanesulfonic acid. These perfluoroalkanesulfonic acid metal salts may be used alone or in combination of two or more thereof.

Metals suitable for use in the perfluoroalkanesulfonic acid metal salts may include Group I metals (i.e., alkali metals), such as sodium and potassium, Group II metals (i.e., alkaline-earth metals), copper, and aluminum. Alkali metals are particularly preferred. Among these perfluoroalkanesulfonic acid metal salts, particularly preferred are potassium salts of perfluorobutanesulfonic acid and potassium salts of perfluoropentanesulfonic acid.

The aromatic sulfonic acid metal salt may be represented by Formula 3:

(3)

In Formula 3, $R_4$ and $R_5$, may each independently be a $C_1$-$C_6$ aliphatic, phenyl, biphenyl, or alkylated phenyl group. In Formula 3, x may be an integer from 0 to 6, y may be an integer from 1 to 6, and M may be a metal cation.

Examples of suitable aromatic sulfonic acid metal salts may include metal salts of diphenylsulfone-3-sulfonic acid, metal salts of diphenylsulfone-3,3'-disulfonic acid, metal salts of diphenylsulfone-3,4'-disulfonic acid, and diphenyl sulfone sulfonate metal salts.

The organic sulfonic acid metal salt may have an average particle diameter of about 100 to about 400 μm. Within this range, stable flame retardancy may be ensured, and high strength of a flame retardant film may be obtained without surface roughening and aggregation of the particles. Preferably, the organic sulfonic acid metal salt has an average particle diameter of about 150 to about 350 μm.

The organic sulfonic acid metal salt may be present in an amount of about 0.01 to about 1.5 parts by weight, based on 100 parts by weight of the polycarbonate resin. The presence of the organic sulfonic acid metal salt within the range defined above may allow for sufficient flame retardancy and may help avoid decomposition of the polycarbonate resin. The organic sulfonic acid metal salt is preferably present in an amount of about 0.05 to about 1.2 parts by weight, more preferably 0.1 to about 1 part by weight.

Polyfluoroethylene Resin (D)

The polyfluoroethylene resin may form a fibrillar network inside the polycarbonate resin. The fibrillar network may decrease the flow viscosity of the polycarbonate resin and increase shrinkage of the polycarbonate resin upon combustion to prevent the polycarbonate resin from dripping.

The polyfluoroethylene resin may be present in an amount ranging from about 0.01 to about 1 part by weight, based on 100 parts by weight of the polycarbonate resin. Within this range, dripping may be effectively prevented without deterioration of dimensional precision.

Additives

The resin composition may further include one or more additives selected from UV absorbers, heat stabilizers, release agents, antistatic agents, dispersants, antioxidants, lubricants, dyes, pigments, and inorganic fillers. The amounts and the methods of use of the additives may be selected from generally used amounts and methods of use.

Method for Producing Flame Retardant Polycarbonate Film

Figure 1:
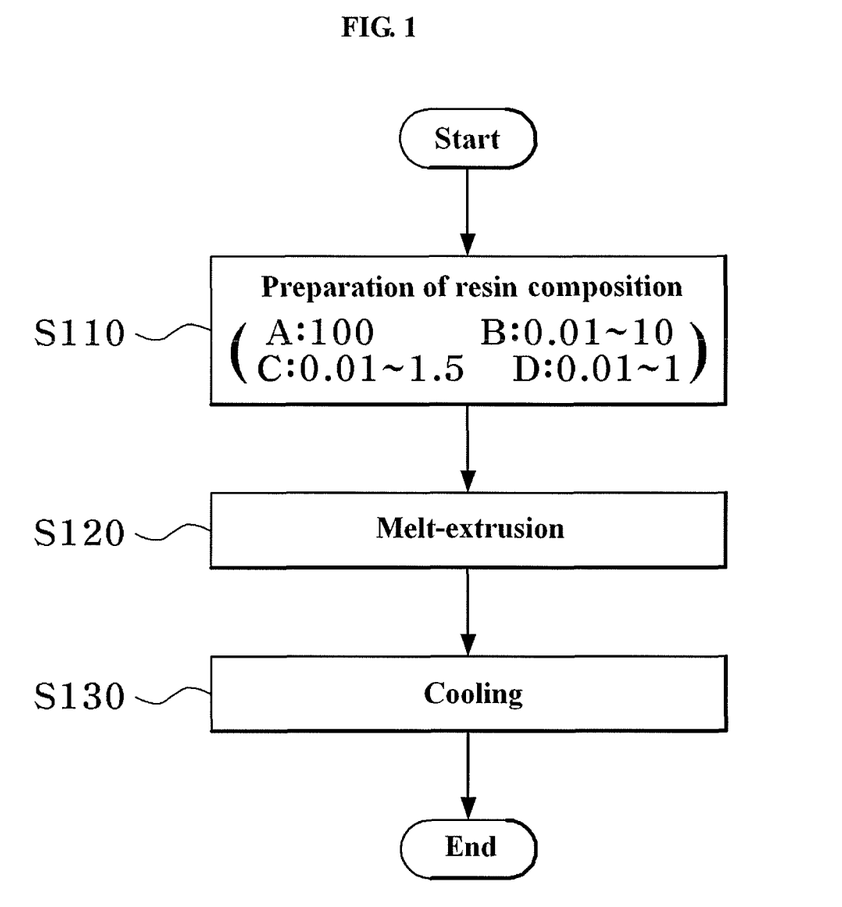
FIG. 1 illustrates a flow chart of a method for producing a flame retardant polycarbonate film according to an example embodiment.

FIG. 1 illustrates a flow chart of a method for producing a flame retardant polycarbonate film according to an example embodiment. Referring to FIG. 1, the method may include preparation of a resin composition (S110), melt-extrusion (S120), and cooling (S130).

In S110, a resin composition may be formed using the polycarbonate resin composition according to an embodiment. For example, the resin composition prepared in S110 may include 100 parts by weight of the polycarbonate resin (A), about 0.01 to about 10 parts by weight of the silicon compound (B), about 0.01 to about 1.5 parts by weight of the organic sulfonic acid metal salt (C) having an average particle diameter of about 100 to about 400 μm, and about 0.01 to about 1 part by weight of the polyfluoroethylene resin (D).

A general method may be used as to the method for preparing the resin composition. Preferably, a twin-screw extruder known to be effective in mixing and kneading flame retardants is used to blend the resin composition.

The twin-screw extruder preferably has an L/D ratio (where L and D are the screw length and diameter, respectively) of about 20 to about 50, more preferably about 28 to about 42. The resin composition may be more uniformly dispersed in a higher L/D ratio. Maintaining the L/D ratio at about 50 or less may help avoid thermal decomposition of the resin. For better mixing and kneading of the resin composition, it is preferred to introduce one to three kneading disk segments into the screw.

In S120, the resin composition may be melt-extruded into a sheet shape through an extruder equipped with T dies. A general method may be used as the method for melt-extruding the resin composition. It is preferred to use a single-screw extruder capable of preventing excessive degradation of the resin composition.

The extruder is preferably equipped with T dies through which the molten resin can be discharged in the form of a film. The interval between the T dies is preferably controllable such that the thickness of the final film can be adjusted as desired. A suitable manual or automatic controller may be used to control the interval between the T dies.

In S130, the sheet-shaped extrudate may be cooled and solidified using cooling rolls.

The film may be produced by, e.g., two different processes: i) a casting process in which the extrudate is naturally discharged into cooling rolls and is solidified while passing through the cooling rolls to form a film; and ii) a polishing process in which the extrudate is discharged and pressed between two cooling rolls to cool a film. The cooling rolls may be polished, or may be etched with an embossed or regular pattern.

When using the flame retardant polycarbonate film as an insulating film for an electronic product, it is preferred to form embossed patterns on one or both surfaces of the flame retardant polycarbonate film. In an implementation, it is preferred to produce the flame retardant polycarbonate film by a polishing process using two cooling rolls, either or both of which are etched with embossed patterns.

EXAMPLES

The following Examples and Comparative Examples are provided in order to set forth particular details of one or more embodiments. However, it will be understood that the embodiments are not limited to the particular details described. Further, the Comparative Examples are set forth to highlight certain characteristics of certain embodiments, and are not to be construed as either limiting the scope of the invention as exemplified in the Examples or as necessarily being outside the scope of the invention in every respect.

Details of components used in the following examples are as follows.

(A) Polycarbonate resin: Calibre 200-3 (LG-Dow) having a melt index (MI) of 3 g/10 min.

(B) Silicon compound: Polydimethyldiphenylsiloxane (TSF-433, Momentive).

(C) Organic sulfonic acid metal salt: Potassium perfluorobutane sulfonate (FR-2025, 3M).

(D) Polyfluoroethylene: Blendex 449 (GE specialty chemical).

Examples 1-6 and Comparative Examples 1-6

Production of Films

Figure 2:
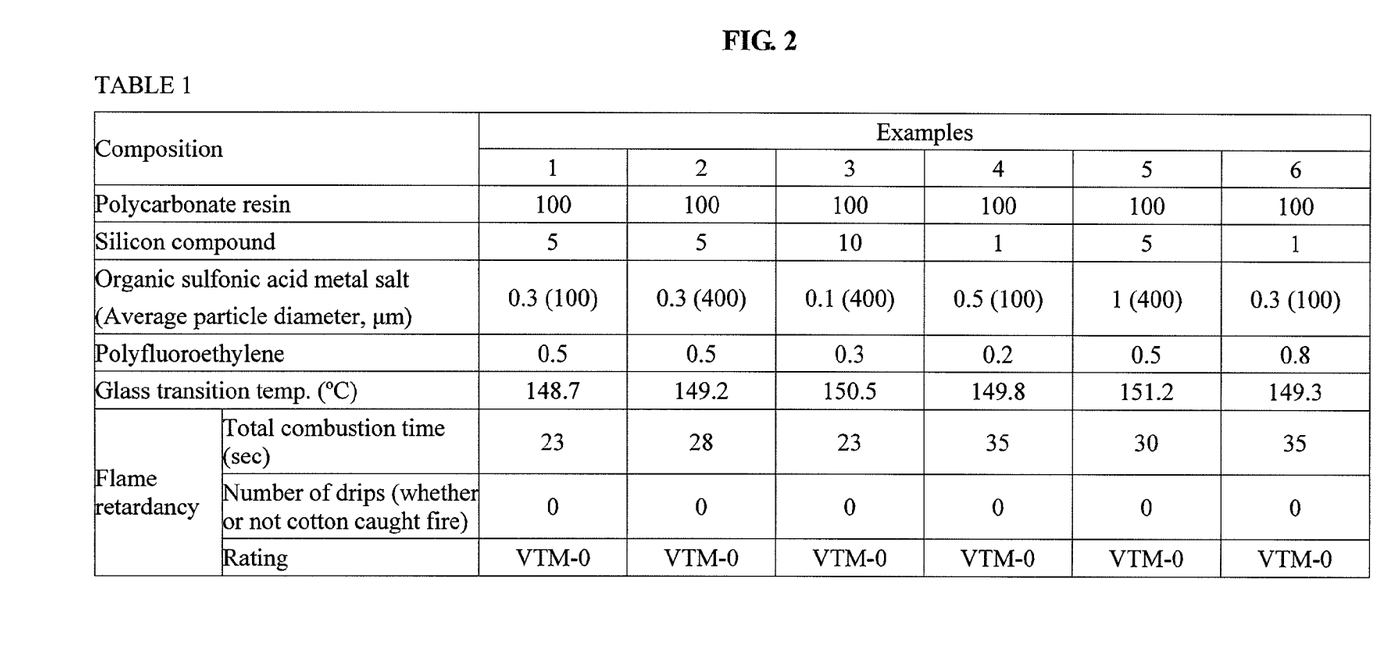
FIGS. 2-4 illustrate Tables 1-3, respectively.
Figure 3:
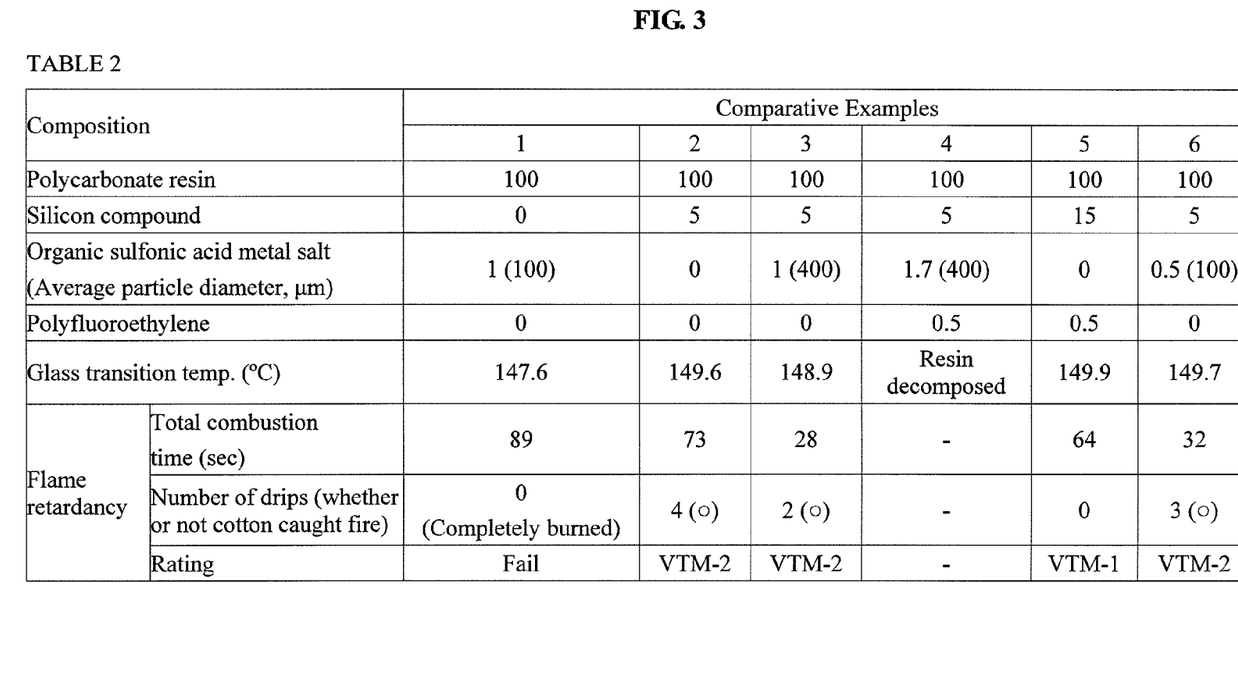

As shown in Tables 1 and 2 in FIGS. 2 and 3, the components were mixed to prepare polycarbonate resin compositions for flame retardant films. Each of the polycarbonate resin compositions was extruded through a twin-screw extruder (Diameter=45 mm, L/D=40) to produce pellets.

The pellets were dried at 120° C. for 4 hr, melted in a single-screw extruder (Diameter=65 mm, L/D=36, cylinder temperature=260° C.), and discharged through T dies.

The extrudate was pressed and cooled between two rolls etched with embossed patterns ("polishing process") to produce a 125 μm thick film.

Measurement Methods

Glass transition temperature (Tg): An appropriate amount of each of the films was sampled. The glass transition temperature of the sample was measured using a differential scanning calorimeter (DSC) while heating from 25 to 200° C. at a rate of 10° C./min.

Flame retardancy: Five specimens (50 mm×200 mm) of each of the films were evaluated in terms of flame retardancy in accordance with the UL-94 standard method. The total combustion time was obtained from the sum of primary and secondary combustion times of the specimens. The number of drips from the specimens during combustion was measured. When dripping was observed during combustion, it was confirmed whether or not cotton caught fire by the dripped molten resin and the number of the drips was recorded. A better result indicates greater flame retardancy.

Evaluation of Physical Properties

As can be seen from the results in Table 1, the flame retardant polycarbonate films of Examples 1, 2, 3, 4, 5 and 6 had glass transition temperatures higher than 140° C. and a flame retardancy rating of VTM-0.

Specifically, the films of Comparative Examples 1, 2, 3, 5, and 6 (each of which did not include one or two components from among the silicon compound, the organic sulfonic acid metal salt, and the polyfluoroethylene) did not reach the flame retardancy rating VTM-0, whereas the flame retardant polycarbonate films of Examples 1-6 had better flame retardancy ratings (VTM-0).

The flame retardant polycarbonate films of Examples 3 and 5 (each of which included the organic sulfonic acid metal salt in an amount of less than 1.5 parts by weight with respect to 100 parts by weight of the polycarbonate resin) showed stable flame retardancy. In the resin composition of Comparative Example 4 (which included the organic sulfonic acid metal salt in an amount exceeding 1.5 parts by weight with respect to 100 parts by weight of the polycarbonate resin), the polycarbonate resin was decomposed simultaneously with the resin blending.

The same resin compositions for flame retardant polycarbonate films (Examples 7-13 and Comparative Examples 7-10) were prepared except that the organic sulfonic acid metal salt had different average particle diameters. Specifically, each of the resin compositions included 100 parts by weight of the polycarbonate resin, 5 parts by weight of the silicon compound, 0.3 parts by weight of the organic sulfonic acid metal salt, and 0.5 parts by weight of the polyfluoroethylene resin. The physical properties of the resin compositions were measured and the results are shown in Table 3 in FIG. 4.

Figure 4:
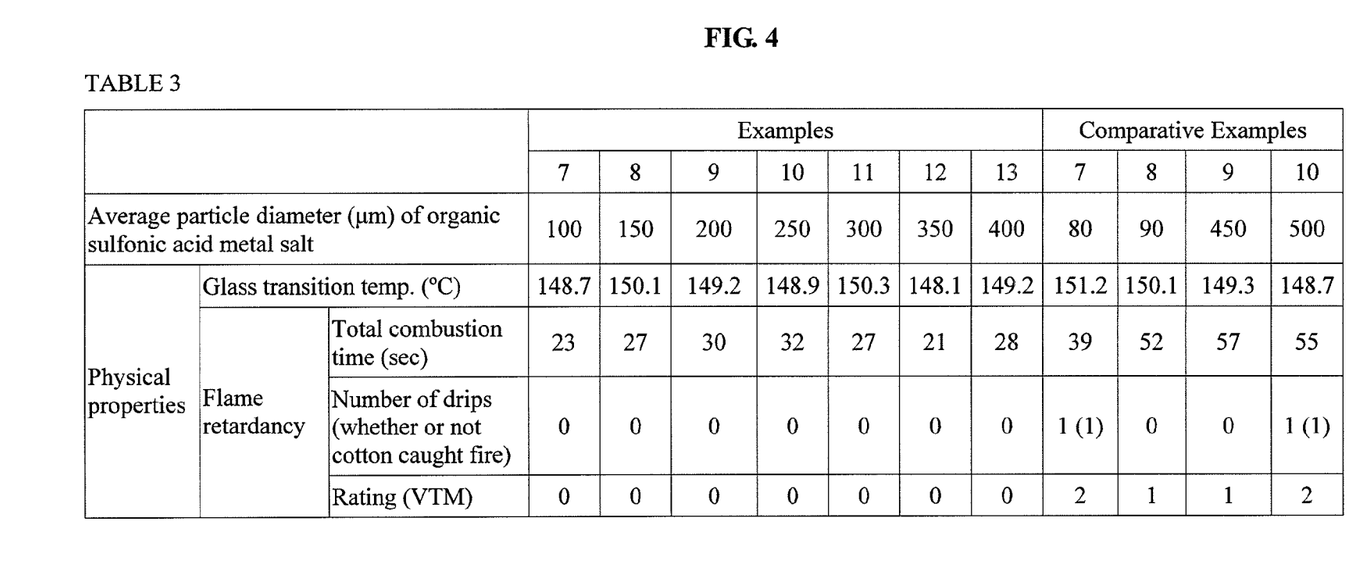

Referring to the results in Table 3, the resin compositions of Examples 7-13 had glass transition temperatures higher than 140° C. and showed stable flame retardancy (VTM-0) without occurrence of dripping. The resin compositions of Comparative Examples 7-10 had comparable glass transition temperatures. However, the particles having a size less than 100 μm aggregated in the resin compositions of Comparative Examples 7 and 8, and the particles larger than 400 μm were not sufficiently dispersed in the resin compositions of Comparative Examples 9 and 10. As a result, the resin compositions of Comparative Examples 7-10 failed to show stable flame retardancy.

Polycarbonate resins for flame retardant films as insulating films for electronic products should be highly dimensionally stable while maintaining good heat resistance. Another requirement is a flame retardancy rating of VTM-0 or better, as tested by the UL-94 standard method.

The flame retardant polycarbonate films of Examples 1-13 met the requirement in terms of flame retardancy. Therefore, the flame retardant polycarbonate films of Examples 1-13 may be particularly suitable for use as insulating films for electronic products due to their excellent characteristics in terms of heat resistance and flame retardancy.

As is apparent from the foregoing, the flame retardant polycarbonate film according to embodiments may exhibit a glass transition temperature of at least 140° C. and a flame retardancy rating of VTM-0 or better.

By way of summation and review, polycarbonate resin films have been extensively used as materials for electronic components of computers and TVs. Polycarbonate resin films as materials for electronic components may be required to have high electrical insulation. Also, for the convenience of portability, polycarbonate resin films should be reduced in weight and size. Other requirements of polycarbonate resin films in consideration of safety are small thickness and flame retardancy. Polycarbonate resin films should be protected from damage by heat emitted from electronic components. To this end, high heat resistance may be required.

Particularly, a high degree of flame retardancy may be needed in flame retardant polycarbonate films. Flame retardants containing halogens, typically bromine (Br), may be added to improve the flame retardancy of flame retardant polycarbonate films, and the addition of halogenated flame retardants may be relatively successful in achieving improved flame retardancy. However, the addition of a large amount of halogen elements may lead to deterioration in the physical properties (e.g., impact resistance) of films and worsening of moldability. Also, gases harmful to humans may be released upon combustion. For these reasons, halogenated flame retardants may not be practical for use in flame retardant polycarbonate films.

As alternatives for halogenated flame retardants, phosphorus flame retardants may be used. However, flame retardancy may not be sufficiently ensured by the addition of a small amount of phosphorus flame retardants, and a drastic deterioration in heat resistance may be caused in proportion to the amount of phosphorus flame retardants added.

The use of inorganic flame retardants, such as metal oxides, and the addition of various kinds of silicon compounds as flame retardants may be considered to address the limitations of halogenated flame retardants and phosphorus flame retardants. However, such flame retardants may have limited applications in the production of flame retardant films. For example, inorganic flame retardants are present in an incompletely melted state in resins. When a resin composition including a polycarbonate resin and a metal oxide as an inorganic flame retardant dispersed in the resin is used to produce a film, the metal oxide may be visible as powder on the surface of the film and may undesirably affect the transparency of the film. Further, when a silicon compound is blended with the polycarbonate resin, the difference in refractive index between the silicon compound and the resin may make the resin and the film hazy and cloudy.

As described above, embodiments relate to a polycarbonate resin composition for a flame retardant film that may exhibit excellent heat resistance and flame retardancy. In an embodiment, a polycarbonate resin composition for a flame retardant film includes a polycarbonate resin, a silicon compound, an organic sulfonic acid metal salt, and a polyfluoroethylene resin. The composition may provide a film with excellent heat resistance and flame retardancy.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A polycarbonate resin composition for a flame retardant film, the composition comprising: 100 parts by weight of a polycarbonate resin, about 0.01 to about 10 parts by weight of a silicon compound, about 0.01 to about 1.5 parts by weight of an organic sulfonic acid metal salt having an average particle diameter of about 150 to about 350 µm, and about 0.01 to about 1 part by weight of a polyfluoroethylene resin.

2. The composition as claimed in claim 1, wherein the polycarbonate resin is selected from the group of a homopolycarbonate resin, a non-halogenated copolycarbonate resin, a fluorine-containing copolycarbonate resin, and a blend thereof.

3. The composition as claimed in claim 1, wherein the polycarbonate resin has a weight average molecular weight of about 15,000 to about 50,000 g/mol.

4. The composition as claimed in claim 1, wherein the silicon compound is represented by Formula I:

wherein:
$R_2$, $R_3$, and $R_4$ are each independently selected from the group of a substituted or unsubstituted $C_1$-$C_{15}$ alkyl group, a substituted or unsubstituted $C_2$-$C_{10}$ alkenyl group, a substituted or unsubstituted $C_5$-$C_{12}$ cycloalkyl group, and a substituted or unsubstituted $C_6$-$C_{12}$ aryl group, each Z is independently selected from the group of a substituted or unsubstituted $C_1$-$C_{15}$ alkyl group, a substituted or unsubstituted $C_2$-$C_{10}$ alkenyl group, a substituted or unsubstituted $C_5$-$C_{12}$ cycloalkyl group, a substituted or unsubstituted $C_6$-$C_{12}$ aryl group, and —OH, n is an integer from about 2 to about 2,000, and
m is an integer from about 2 to about 2,000.

5. The composition as claimed in claim 4, wherein each of $R_2$, $R_3$, and $R_4$ includes at least one selected from the group of a fluorinated $C_1$-$C_{15}$ alkyl group, a fluorinated $C_2$-$C_{10}$ alkenyl group, a fluorinated $C_5$-$C_{12}$ cycloalkyl group, and a fluorinated $C_6$-$C_{12}$ aryl group.

6. The composition as claimed in claim 1, wherein the silicon compound has a weight average molecular weight of about 5,000 to about 500,000 g/mol.

7. The composition as claimed in claim 1, wherein the organic sulfonic acid metal salt includes an aliphatic or aromatic sulfonic acid metal salt.

8. The composition as claimed in claim 7, wherein the organic sulfonic acid metal salt includes the aliphatic sulfonic acid metal salt, and the aliphatic sulfonic acid metal salt is selected from the group of a C1-C10 alkane sulfonic acid metal salt, a fluorinated C1-C10 alkane sulfonic acid metal salt, and a combination thereof.

9. The composition as claimed in claim 7, wherein the organic sulfonic acid metal salt includes the aromatic sulfonic acid metal salt, and the aromatic sulfonic acid metal salt is a diphenyl sulfone sulfonate metal salt.

10. The composition as claimed in claim 1, further including at least one additive, the additive being selected from the group of a UV absorber, a heat stabilizer, a release agent, an antistatic agent, a dispersant, an antioxidant, a lubricant, a dye, a pigment, and an inorganic filler.

11. A method for producing a flame retardant polycarbonate film, the method comprising:
(a) blending the composition as claimed in claim 1,
(b) melt-extruding the blended composition into a sheet, and
(c) cooling the extruded sheet.

12. The method as claimed in claim 11, wherein the composition is blended using a twin-screw extruder.

13. The method as claimed in claim 12, wherein the twin-screw extruder has an L/D ratio (where L and D are screw length and diameter, respectively) of about 20 to about 50.

14. The method as claimed in claim 12, wherein operation (b) is carried out using a single-screw extruder.

15. The method as claimed in claim 11, wherein, in operation (b), the sheet is discharged, pressed, and cooled between two cooling rolls.

16. The method as claimed in claim 15, wherein at least one of the two cooling rolls has an embossed pattern on a sheet-contacting surface thereof.

17. A flame retardant polycarbonate film produced by the method as claimed in claim 11.

18. The flame retardant polycarbonate film as claimed in claim 17, wherein the film has a glass transition temperature of at least 140° C. and a UL-94 flame retardancy of VTM-0 or better.

19. A flame retardant polycarbonate film comprising the composition as claimed in claim 1.

20. The flame retardant polycarbonate film as claimed in claim 19, wherein the film has a glass transition temperature of at least 140° C. and a UL-94 flame retardancy of VTM-0 or better.

* * * * *